3,427,006
VARIABLE ORIFICE GAS SCRUBBER
Andrew Oiestad, Staten Island, N.Y., assignor to Automotive Rubber Company, Inc., Detroit, Mich., a corporation of Michigan
Filed Apr. 12, 1965, Ser. No. 447,214
U.S. Cl. 261—112          3 Claims
Int. Cl. B01d 47/10

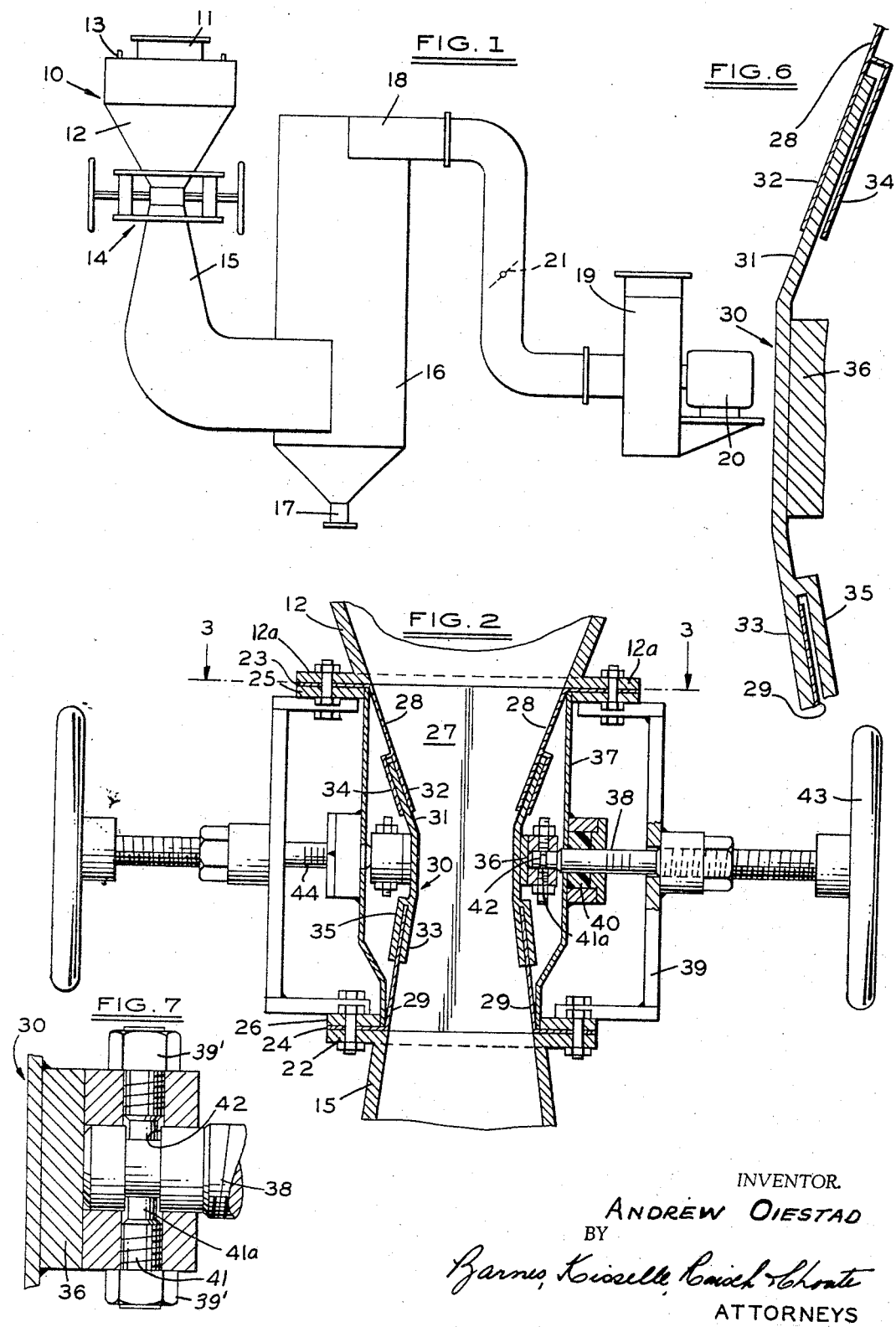

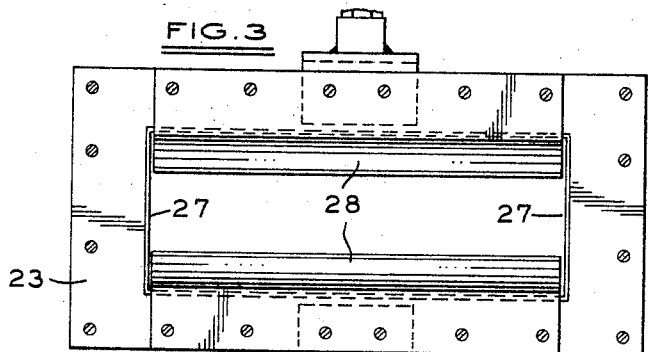
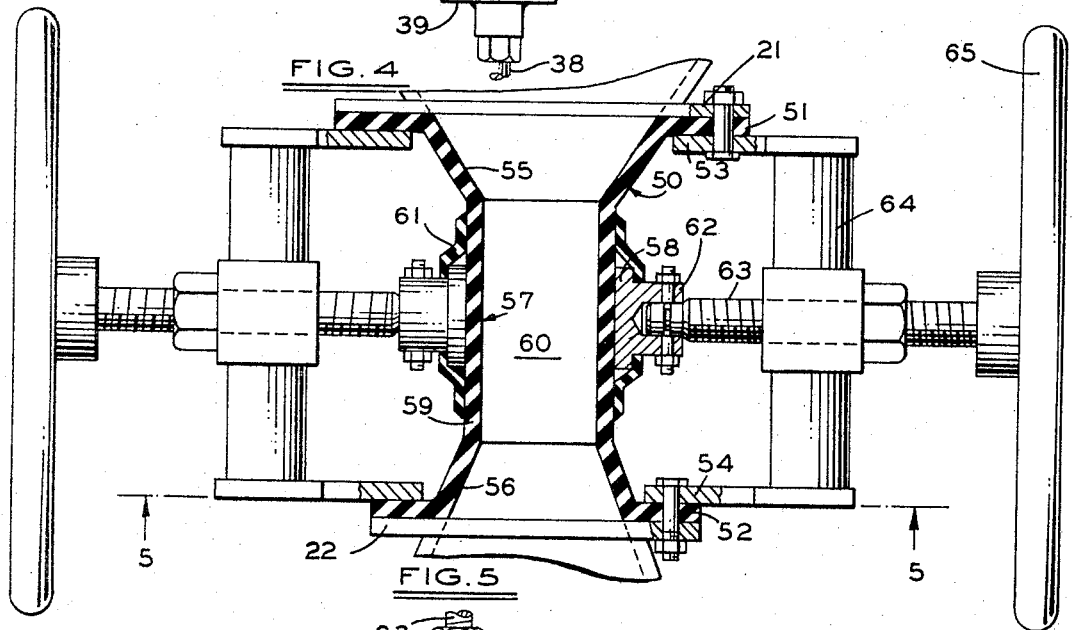
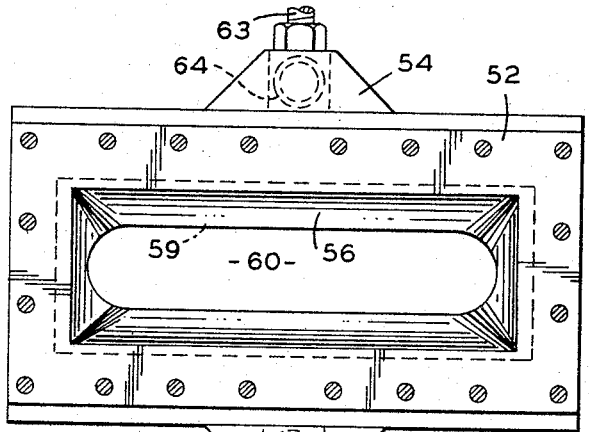

ABSTRACT OF THE DISCLOSURE

A gas scrubber having a converging section, a throat section and a diverging section. Adjustment means are provided for moving the throat section so as to vary the size of the throat during operation of the gas scrubber.

---

This invention relates to gas scrubbers and particularly to gas scrubbers of the type wherein gases to be cleaned are intermixed intimately with liquids and moved at high velocities to entrain the solids in the liquids.

A common type of gas scrubber utilizes a converging section, a throat section and a diverging section. The gases to be scrubbed are introduced into the converging section fastened to the converging portion where they are mixed intimately in the liquid after which the gases and liquid pass through a diverging section. At the throat section, the liquid particles entrain the solids of the gas and thereby result in a scrubbing action on the gases.

In the design of such scrubbers, it is important to make the size of the throat orifice as close to the proper size as possible. However, it often happens that in use the operating conditions vary and if a fixed orifice is used, the scrubber will not operate at optimum efficiency. It is therefore desirable to provide a variable orifice gas scrubber whereby the size of the orifice can be adjusted in use.

It is therefore an object of this invention to provide a variable throat orifice on a gas scrubber.

It is a further object of the invention to provide such a variable throat orifice which is relatively inexpensive and requires a minium of maintenance.

It is a further object of the invention to provide such a gas scrubber wherein the size of the orifice can be readily adjusted without interrupting operation of the system in which the gas scrubber is installed.

In the drawings:

FIG. 1 is a partly diagrammatic view of a complete gas scrubber system embodying the invention.

FIG. 2 is a vertical sectional view through the venturi throat portion of the scrubber system.

FIG. 3 is a fragmentary sectional view taken along the lines 3—3 in FIG. 2, parts being broken away.

FIG. 4 is a fragmentary sectional view similar to FIG. 2 of a modified form of the invention.

FIG. 5 is a fragmentary sectional view taken along the line 5—5 in FIG. 4.

FIG. 6 is a fragmentary sectional view on an enlarged scale of a portion of the structure shown in FIG. 2.

FIG. 7 is a fragmentary sectional view on an enlarged scale of another portion of the structure shown in FIG. 2.

Referring to FIG. 1, a typical gas scrubber system in which the invention may be used comprises a venturi type scrubber 10 into which gases from an inlet 11 are introduced and pass downwardly into a converging section 12. Liquid from nozzles 13 is sprayed downwardly into the converging section and the gases and liquid pass through a throat section 14 where the solids are entrained in the liquid particles and thereafter pass into a diverging section 15. The mixture of gas, liquid and solids then passes to a cyclonic scrubber 16 where centrifugal action is imparted to the mixture causing the liquids with entrained solids to pass downwardly to an outlet 17 and the scrubbed gases moved outwardly through outlet 18. The movement of the gases through the system is caused by a suction fan 19 driven by a motor 20. Conventionally, a damper 21 can be provided in the system to vary the conditions of operation of the system in accordance with the operation of the chemical or other processing plant utilized with the scrubber system.

In accordance with the invention as shown in FIG. 2, the throat 14 comprises a variable orifice which is formed so that the wall portions of the orifice are movable toward and away from one another to vary the size of the orifice. Specifically, as shown in FIGS. 2 and 3, the variable orifice assembly is adapted to be bolted between the flanges 22 on the lower end of the converging portion 12 and the flanges 12a on the upper end of the diverging section 15. The throat comprises upper and lower flanges 23, 24 which are reinforced by rectangular frames 25, 26. Integral end walls 27 extend downwardly between opposed flanges 23, 24 and form the end walls of the orifice which is rectangular. In addition relatively, fixed side walls 28 are deflectable and converge downwardly from the opposite sides of the flanges 23 to define a peripheral slot between portions 32 and 34. Similarly, relatively fixed side walls 29 are deflectable and diverge downwardly toward the opposite sides of the flanges 24.

A movable side wall section 30 is provided in cooperation with each pair of the upper and lower relatively fixed side walls 28, 29 to provide for extension and contraction of the wall surfaces of the throat and thereby vary the size of the orifice. As shown in FIG. 2, movable section 30 comprises an inclined wall portion 31, and a downwardly inclined wall portion 33 which are in juxtaposed relation to the walls 28, 29, respectively. An integral extension 33, 35 is provided beneath relatively fixed side walls 28, 29 defining a second slot into which the wall 29 extend to hold the relatively fixed wall 29 positioned. The relatively fixed walls 28, 29 and extensions 34, 35 are slidable relative to portions 31, 32, 33 so that the walls 28, 29 can flex slightly as the movable sections 30 are moved inwardly and outwardly.

A bracket 36 is mounted on the outer side of each vertical portion 31. The entire area in back of the walls 28, 29, 31, 32 is enclosed by generally vertical sealing walls 37 that extend between the end walls 27. The movable sections 30 are adapted to be moved inwardly and outwardly by an arrangement that includes a shaft 38 that is threaded through a bracket 39 fixed between flanges 25, 26 and extending through a seal formed by a block 40 of Teflon packing material on the wall 37. The end of the shaft 38 is journalled in bracket 36 by an arrangement which includes screws 41 and heads 39' that have reduced ends 41a extending into an annular groove 42 in the end of the shaft. Each shaft is provided with a hand wheel 43 to facilitate operation of the shaft and indicia 44 to provide for adjustment in a predetermined known fashion.

By this arrangement, in operation, the shaft 38 can be rotated by manipulating the hand wheel 43 to move the movable sections 30 inwardly and outwardly and cause the movable walls 31, 33 to move along the general planes of the walls 28, 29, respectively. When the sections 30 are moved inwardly, the walls 31, 33 move along walls 28, 29 and toward one another to make the orifice smaller. Conversely, when the sections 30 are moved outwardly, the walls 31, 33 move in a direction to cause the orifice to become enlarged. Walls 31, 33 flex slightly during movement of walls 28, 29.

In the form of the invention shown in FIG. 4, the variable throat comprises a rectangular body 50 having rounded corners made of elastic material such as rubber having integral top and bottom flanges 51, 52. A rectangular metal frame 53, 54 is preferably vulcanized on the flanges 51, 52 to serve as a rigid means for mounting the body 50 on the flanges 21, 22 of the scrubber. As shown in FIGS. 4 and 5, the body 50 has an inwardly tapering upper wall 55 and an inwardly and upwardly tapering lower wall 56 connected by a generally vertical wall 57 that is elongated to generally simulate the rectangular orifice of the scrubber shown in FIGS. 2 and 3.

A bar of metal 58 is vulcanized to the opposed side walls 59 of the body 50. In addition, an integral layer 61 of rubber is provided over the bar. The bar includes a bracket portion 62 extending outwardly through the layer 61 of rubber and serving to journal the shaft 63 in the manner shown in FIG. 7. The shaft 63 is threaded on a bracket 64 which extends between the flanges 53, 54 as in the previous form of the invention and a hand wheel is provided on the end of the shaft.

It can thus be seen that there has been provided a variable gas scrubber wherein the size of the throat can be varied during the operation of a gas scrubber in a system wherein the throat provides an effective seal and requires a minimum of maintenance.

I claim:

1. In a gas scrubber, the improvement of a variable throat venturi comprising; a converging deflectable wall portion extending from a venturi inlet, said wall portion including means forming a peripherally formed slot at the smaller diameter end; a movable wall portion forming the smallest diameter of the venturi throat and having two diverging portions on opposite sides of said smallest diameter, a first diverging portion being slidable in said peripherally formed slot in telescoping fashion and a second diverging portion having means forming a peripherally formed slot at an extreme thereof; a diverging deflectable wall portion extending toward the venturi outlet from said rigid wall portion and being slidable in the peripherally formed slot of said rigid wall portion in telescoping fashion; and means for moving siad movable wall portion to and fro to vary the dimension of the smallest diameter of the venturi throat by simultaneously sliding with respect to said deflectable converging and diverging wall portions.

2. In a gas scrubber according to claim 1 wherein said last mentioned means comprises bracket means carried by said movable wall portion, and rotatable means adapted to incrementally move said movable wall portion translationally.

3. In a gas scrubber according to claim 2 wherein said rotatable means includes means movable relative to fixed portions of said gas scrubber to enable visual indication of the amount of relative movement between said rotatable means and a fixed portion of said gas scrubber.

References Cited

UNITED STATES PATENTS

| 1,360,445 | 11/1920 | Rollins | 261—62 X |
| 1,552,623 | 9/1925 | Little. | |
| 2,424,654 | 7/1947 | Gamble | 138—45 X |
| 2,472,949 | 6/1949 | Jackson | 138—45 |
| 3,138,647 | 6/1964 | Krantz. | |
| 3,218,047 | 11/1965 | Calaceto. | |
| 3,350,076 | 10/1967 | Crommelin. | |

FOREIGN PATENTS

| 506,237 | 10/1951 | Belgium. |
| 1,038,357 | 9/1958 | Germany. |
| 1,381,960 | 11/1964 | France. |

RONALD R. WEAVER, *Primary Examiner.*

U.S. Cl. X.R.

261—115